United States Patent
Sugitani

(10) Patent No.: US 6,775,554 B1
(45) Date of Patent: Aug. 10, 2004

(54) CALLING APPARATUS AND CALLING METHOD IN A TELEPHONE

(75) Inventor: Toshiyuki Sugitani, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/549,529

(22) Filed: Apr. 14, 2000

(30) Foreign Application Priority Data

Apr. 15, 1999 (JP) .......................................... 11-107914

(51) Int. Cl.⁷ ................................................. H04Q 7/20
(52) U.S. Cl. ........................ 455/463; 455/507; 455/417; 379/142.12
(58) Field of Search ................................. 455/412, 414, 455/415, 550, 555, 566, 567, 575, 514, 67.7, 507, 561, 90, 435, 462, 463, 464; 379/418, 142, 93.23

(56) References Cited

U.S. PATENT DOCUMENTS

| | | | | |
|---|---|---|---|---|
| 5,255,308 A | * | 10/1993 | Hashimoto et al. | 455/463 |
| 5,475,736 A | * | 12/1995 | Ito | 455/463 |
| 5,490,205 A | * | 2/1996 | Kondo et al. | 379/67.1 |
| 5,515,420 A | * | 5/1996 | Urasaka et al. | 455/564 |
| 5,517,551 A | * | 5/1996 | Arai | 455/566 |
| 5,530,745 A | * | 6/1996 | Urasaka et al. | 379/355.05 |
| 5,572,531 A | * | 11/1996 | Nitta et al. | 370/537 |
| 5,590,183 A | * | 12/1996 | Yoneda et al. | 379/142.01 |
| 5,644,621 A | * | 7/1997 | Yamashita et al. | 455/463 |
| 5,687,218 A | * | 11/1997 | Nakayama | 455/415 |
| 5,854,983 A | * | 12/1998 | Goto et al. | 455/462 |
| 6,253,089 B1 | * | 6/2001 | Schlosser et al. | 455/465 |
| 6,327,477 B1 | * | 12/2001 | Hachimura et al. | 455/464 |
| 6,333,978 B1 | * | 12/2001 | Tamura | 379/142.12 |
| 6,351,637 B1 | * | 2/2002 | Lee | 455/415 |
| 6,434,394 B1 | * | 8/2002 | Grundvig et al. | 455/463 |

FOREIGN PATENT DOCUMENTS

| | | |
|---|---|---|
| JP | 06-284080 | 10/1994 |
| JP | 10-257140 | 9/1998 |
| JP | 10-262122 | 9/1998 |

* cited by examiner

*Primary Examiner*—Tilahun Gesesse
(74) *Attorney, Agent, or Firm*—Wenderoth, Lind & Ponack, L.L.P.

(57) ABSTRACT

A telephone number memory circuit is provided in which data for determining the display of a call on a selected one of call receiving modules depending on the telephone number of a caller is stored. As the call is received from the service network, the telephone number of a caller is detected by a telephone number detecting circuit and transferred to a control module. The control module compares the detected telephone number with the data saved in the telephone number memory circuit to determine the display of the call on the selected one of a call display of a master unit, a call display of a first sub unit, and a call display of a second sub unit and directs the selected call display to indicate that the call is received. In a telephone system including a number of telephone terminals, a calling apparatus directs a selected one of the telephone terminals to display the call depending on the telephone number of a caller.

16 Claims, 3 Drawing Sheets

CALLING APPARATUS AND CALLING METHOD IN A TELEPHONE

BACKGROUND OF THE INVENTION

The present invention relates to a calling method and a calling apparatus in a telephone set linked to a service network capable of informing of the telephone number of a caller.

There have been provided various types of telephone sets linked to a service network and having two or more call display modules, including a PBX linked by wire lines to a plurality of telephone terminals and a combination of a master unit linked to a service network and sub units connected by radio lines to the master unit, such as a cordless telephone system. It is now known in the cordless telephone system, as PHS systems have increasingly been utilized, to have a digital cordless telephone master unit connected to commercial PHS telephones as digital cordless telephone sub units. As the PHS telephones are connected via the digital cordless master unit to a cabled service network, they can favorably be used by users as private cordless telephone sub units in both public and private modes.

In such a conventional telephone system, a calling method in response to the receipt of a call from the service network is based on displaying the call on substantially all the call display modules. More particularly, as the call is received from the service network in a telephone system having a PBX connected by wire lines to a group of telephone terminals, all of the telephone terminals start ringing almost at once indicting that the call is received. In the case of a cordless telephone system, the master unit and the sub units in standby are simultaneously triggered for ringing or vibrating to indicate that the call is received. Also, when the PHS telephones are used as cordless telephone sub units or dedicated to only private telephone communications, they, as well as the master unit, start simultaneously indicating the existence of the call upon the call being received by the master unit.

In such a conventional telephone system having two or more call receiving modules with a call display, the calling is made by allowing all of the call displays to indicate substantially at the same time that the call is received. It is hence necessary that any of the telephone terminals responds to the call and after identifying the destination of the call, transfers the call to the target telephone terminal. Accordingly, the disadvantages are that the transfer is troublesome and that the receipt of the call is known by users other than the user to which the call is made and secrecy about the communications is impaired.

SUMMARY OF THE INVENTION

It is thus an object of the present invention, in view of the foregoing disadvantages, to provide a calling apparatus and a calling method for a telephone set which can minimize the troublesome transfer action and protect the secrecy of the communications.

A calling apparatus in a telephone set according to the present invention comprises: an interface circuit for connecting to a service network; a call detecting means connected to the interface circuit for detecting a call from the service network; a telephone number detecting means connected to the interface circuit for detecting the telephone number of a caller from the service network during the connection; at least two call displaying means for indicating that the call is received from the service network; a telephone number memory means in which data for determining the display of the call on a selected one of the call displaying means depending on the telephone number of the caller is stored; and a controlling means for, when the call from the service network is detected by the call detecting means and the telephone number of the caller is detected by the telephone number detecting means, comparing the detected telephone number with the data stored in the telephone number memory means and directing the desired one of the call displaying means designated for display of the detected telephone number to indicate that the call is received from the service network, whereby only the call displaying means dedicated to the telephone number of the caller received can be initiated to indicate the call.

DESCRIPTION OF THE PREFERRED EMBODIMENTS

Figure 1:
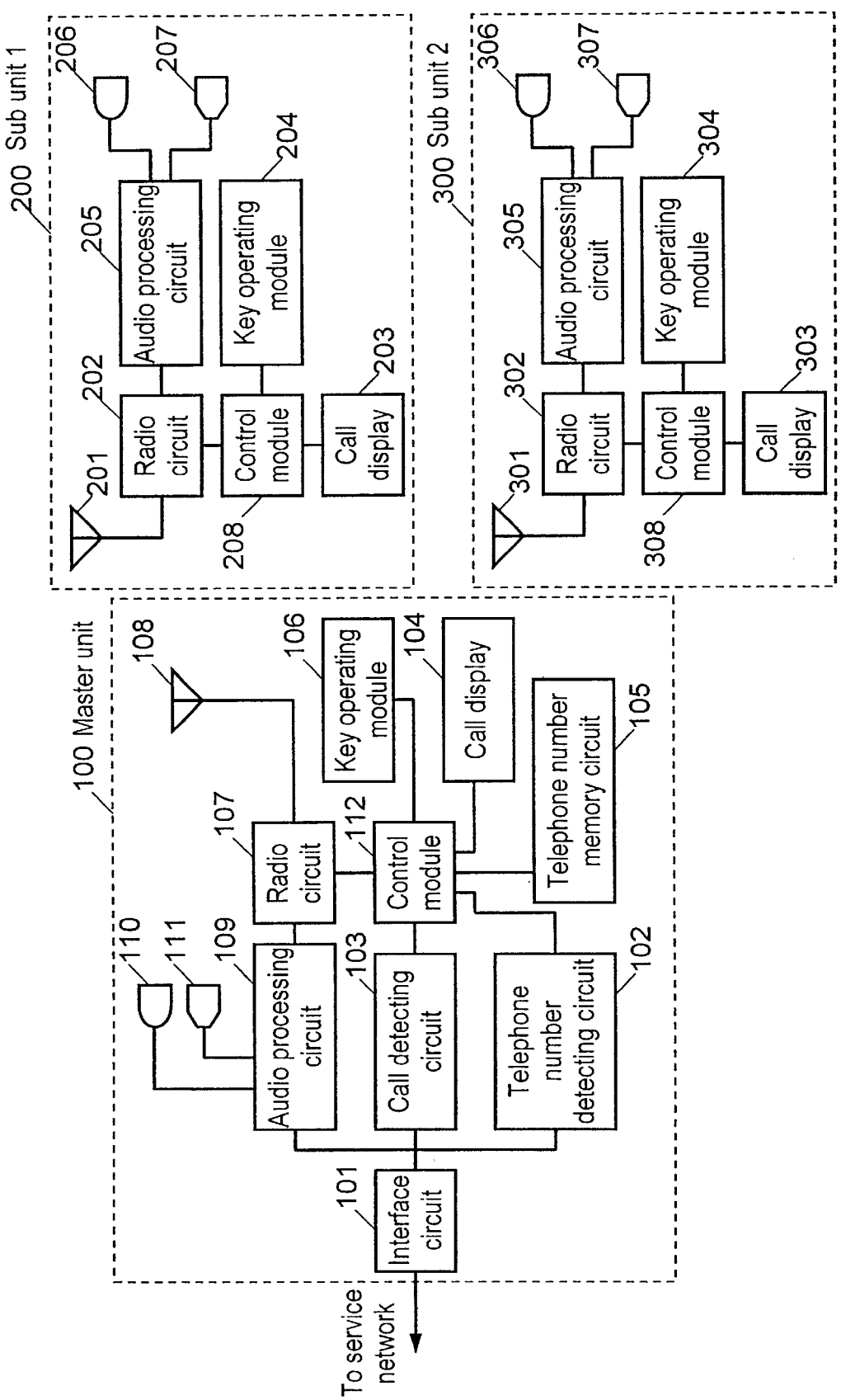
FIG. 1 is a schematic view of a telephone set using a calling apparatus of Embodiment 1 of the present invention.

The preferred embodiments of the present invention will be described referring to the drawings.

Embodiment 1

FIG. 1 is a schematic view of a calling apparatus in a telephone set showing Embodiment 1 of the present invention. The calling apparatus in the telephone set of Embodiment 1 comprises a master unit 100 and a first sub unit 200 and a second sub unit 300.

The master unit 100 is a base unit of a cordless telephone which is linked to the service network and has a call receiver explained below. The call receiver comprises an interface circuit 101 for connection between the service network and the master unit 100, a telephone number detecting circuit 102 for detecting the telephone number of a caller received via the interface circuit 101 from the service network and outputting its data, a call detecting circuit 103 for detecting a call signal received via the interface circuit 101 from the service network and outputting a call detection signal, a call display 104 for, when the receipt of a call from the service network is detected by the call detecting circuit 103, displaying the call with a combination of light, characters, and symbols, a telephone number memory circuit 105 in which relevant data for selectively determining the display on the call receiver display of the call depending on the telephone number detected by the telephone number detecting circuit 102 are stored, a key operating module 106 provided with a key pad for setting the relevant data in the telephone number memory circuit 105 and for responding to the call, acting as call responding means, a radio circuit 107 for converting an audio signal and a control signal such as a call signal into radio signals for transmission and also demodulating a received radio signal into an audio signal and a control signal, an antenna 108 for transmitting and receiving the radio signal, an audio signal processing circuit 109 for performing signal processing such as amplification of the audio signal during the connection, a microphone 110 for picking up sound during the connection, a loudspeaker 111 for emitting sound during the connection, and a control module 112 for controlling the entire action of the master unit 100.

The first sub unit 200 is registered to the master unit 100 and has a call receiver comprising an antenna 201 for transmitting and receiving a radio signal, a radio circuit 202 for converting an audio signal and a control signal such as a call signal into radio signals for transmission and also demodulating a received radio signal into an audio signal and a control signal, a call display 203 for, when a call from the master unit 100 is detected, displaying the call with a combination of light, characters, and symbols on a call displaying means, a key operating module 204 provided with a set of keys for entry of telephone numbers and responding to the call, an audio signal processing circuit 205 for performing a signal processing such as amplification of the audio signal during the connection, a microphone 206 for picking up sound during the connection, a loudspeaker 207 for emitting sound during the connection, and a control module 208 consisting mainly of a microprocessor for controlling the entire action of the sub unit 200.

The second sub unit 300 is registered to the master unit 100 and its inside structure is identical to the first sub unit 200, in which like blocks are denoted by like numerals as those of the first sub unit 200 and will be explained in no more detail.

The action of a cordless telephone having the above described calling apparatus of the present invention is now explained assuming that a call is received.

The explanation starts with presetting the telephone number memory circuit 105. The relevant data for selectively determining the display of the telephone number of a caller on the call display 104 are predetermined and saved in the telephone number memory circuit 105. For saving a desired set of telephone numbers in the telephone number memory circuit 105, corresponding keys on the key operating module 106 are used to initiate the setting of telephone numbers in the master unit 100. When the control module 112 detects the action of the keys, it directs the master unit 100 to preset and save the telephone numbers in the telephone number memory circuit 105. In the telephone number memory circuit 105, the telephone number of each caller is saved so that it can be displayed on a desired one or a combination of the master unit 100, the sub unit 200, and the sub unit 300. More particularly, when the setting of the telephone numbers on the master unit 100 is enabled, the telephone number of a caller and its relevant instruction indicating whether the telephone number of the caller is displayed on the call display of the master unit 100 or one of the sub units 200 and 300 are entered and registered in combination using the key operating module 106. The registered data entered through the key operating module 106 are then written and saved in the telephone number memory circuit 105 by the action of the control module 112.

Table 1 illustrates an example of the registered data in the telephone number memory circuit 105.

TABLE 1

| caller telephone numbers | master unit | sub unit 1 | sub unit 2 |
|---|---|---|---|
| 0001 | 1 | 1 | 0 |
| 0002 | 1 | 0 | 1 |
| 0003 | 1 | 0 | 0 |
| 0004 | 0 | 1 | 0 |
| 0005 | 0 | 0 | 1 |

As shown in Table 1, the telephone number of a caller and its instruction indicating whether it is displayed on the master unit 100, the first sub unit 200 (referred to as a sub unit 1), and/or the second sub unit 300 (referred to as a sub unit 2) are stored in combination in the telephone number memory circuit 105. In Table 1, the value "1" represents the display of the call, while the value "0" represents no display of the call. More specifically, the call from the telephone number 0001 is displayed on both the master unit 100 and the sub unit 1. Similarly, the call from 0002 is displayed on both the master unit 100 and the sub unit 2, the call from 0003 on only the master unit 100, from 0004 on only the sub unit 1, and the call from 0005 on only the sub unit 2.

The response to the call is explained next. When the call is received from the service network, it is accompanied with a signal including the telephone number of the caller. The signal including the telephone number of the caller is transferred via the interface circuit 101 to the telephone number detecting circuit 102 in the master unit 100. The telephone number detecting circuit 102 extracts the telephone number of the caller from the signal and transmits it to the control module 112. A call signal indicating that the call is made is also received from the network. The call signal is transferred by the interface circuit 101 to the call detecting circuit 103 in the master unit 100. Upon receiving the call signal, the call detecting circuit 103 informs the control module 112 that the call is received. The control module 112, when being informed that the call is received, compares the telephone number of the caller detected by the telephone number detecting circuit 102 with the telephone numbers saved in the telephone number memory circuit 105. When the telephone number of the caller is identical to a number registered in the telephone number memory circuit 105, the control module 112 controls to display the telephone number on the master and/or sub units according to the combination data saved in the telephone number memory circuit 105. For displaying the telephone number of the caller on the master unit 100, the control module 112 signals and drives the call display 104 to indicate that the call is received. For displaying the telephone number on any sub unit, the control module 112 directs the radio circuit 107 to modulate the control signal indicating that the call is received into a radio signal and transmits the radio signal from the antenna 108. On the other hand, the sub units stand by with their respective control modules 208 and 308 enabling the radio circuits 202 and 302 to receive the radio signal from the master unit 100. More specifically, the radio signal from the master unit 100 is received by the antennas 201 and 301 and transferred to the radio circuits 202 and 302 for demodulation. The demodulated signal is fed to the control modules 208 and 308. When the control modules 208 and 308 recognize the demodulated signal including that the call is received, they direct the call displays 203 and 330 to display the telephone number of the caller.

Under the control action of the above arrangement, when the call is received from the telephone number 0001 of the caller, it is displayed on both the call display 104 of the master unit 100 and the call display 203 of the first sub unit 200 according to the combination data (in Table 1) saved in the telephone number memory circuit 105 in the master unit 100. Similarly, when the call is received from the telephone number 0002, it is displayed on the call display 104 of the master unit 100 and the call display 303 of the second sub unit 300.

If the telephone number of the caller is not found in the table saved in the telephone number memory circuit 105, it is displayed on all of the call display 104 of the master unit 100, the call display 203 of the first sub unit 200, and the call display 303 of the second sub unit 300.

As described, according to the method of Embodiment 1, the call is displayed on a preset group of the call displays depending on the telephone number of its caller and can hence be connected directly to the telephone set or terminal desired by the caller.

Embodiment 2

Figure 2:
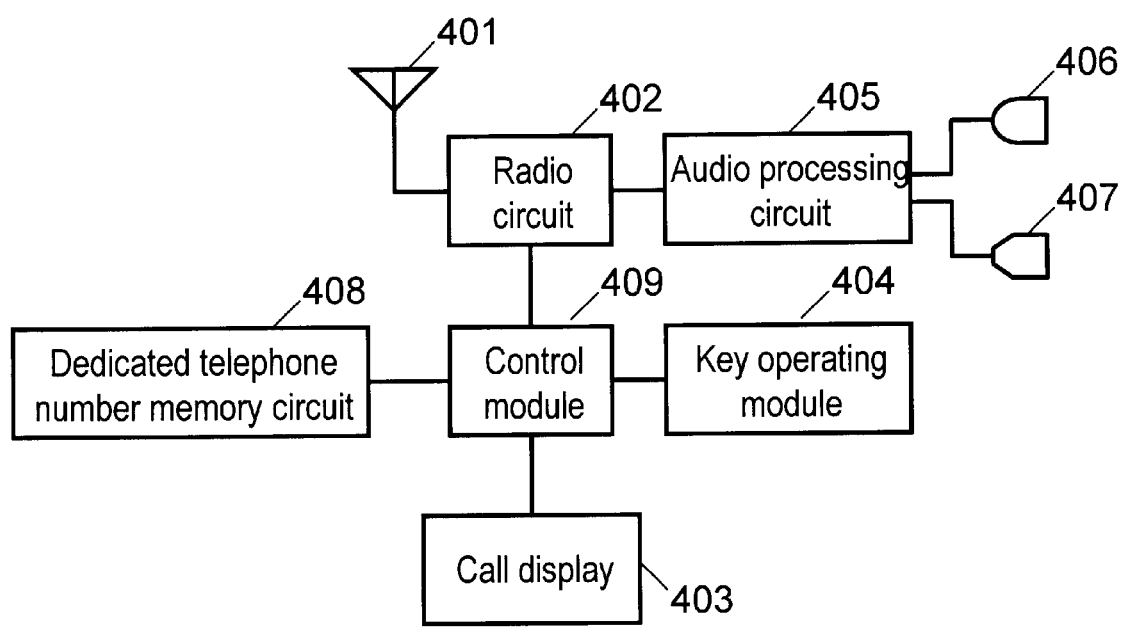
FIG. 2 is a schematic view of another example of the sub unit of a cordless telephone set as a call receiving module of Embodiment 1 of the calling apparatus of the present invention.

FIG. 2 illustrates another example of the sub unit of the cordless telephone described with Embodiment 1, which has a calling apparatus of the present invention.

As shown in FIG. 2, the sub unit of the cordless telephone of Embodiment 2 comprises an antenna 401 for transmitting and receiving a radio signal, a radio circuit 402 for converting an audio signal and a control signal such as a call signal into radio signals for transmission and also demodulating a received radio signal into an audio signal and a control signal, a call display 403 for, when a call from the master unit 100 is detected, displaying the call with a combination of light, characters, and symbols on a call displaying means, a key operating module 404 provided with a set of keys for entry of telephone numbers and responding to the call, an audio signal processing circuit 405 for performing signal processing such as amplification of the audio signal during the connection, a microphone 406 for picking up sound during the connection, a loudspeaker 407 for emitting sound during the connection, a dedicated telephone number memory circuit 408 in which telephone number relevant data of callers to be desirably displayed upon the connection are stored, and a control module 409 for controlling the entire action of the sub unit.

A method of determining and saving the telephone number relevant data in the telephone number memory circuit 105 of the master unit 100 with the use of the above sub unit is explained.

In the dedicated telephone number memory circuit 408 in the sub unit, the telephone numbers of selected callers to be displayed when their call is received from the service network are stored. For saving the telephone number relevant data in the dedicated telephone number memory circuit 408, the key operating module 404 is used to shift an action mode of the sub unit to a setting mode for the dedicated telephone number memory circuit 408. More specifically, when corresponding keys are actuated, the control module 409 turns the action mode of the sub unit to the setting mode for the dedicated telephone number memory circuit 408. Then, as the telephone numbers are entered using the key operating module 404, they are written and saved in the dedicated telephone number memory circuit 408 by the action of the control module 409. In a case where the sub unit is a PHS telephone which can be wireless linked directly to the service network, the telephone number of each caller informed by a local station of the PHS system during the connection from the telephone number to the PHS telephone can desirably be saved in the dedicated telephone number memory circuit 408.

As described, the telephone numbers of the selected callers to be displayed upon connection can be stored in the dedicated telephone number memory circuit 408 through directly entering the telephone numbers from the key operating module 404 or registering the telephone number of each caller when it is received from the PHS service network.

A method of setting and saving, in the telephone number memory circuit 105 of the master unit 100, the telephone number relevant data stored in the dedicated telephone number memory circuit 408 of the sub unit is now explained.

As the key operating module 404 of the sub unit starts a transfer mode for transferring the telephone number stored in the dedicated telephone number memory circuit 408, its starting action is detected by the control module 409. The control module 409 then feeds the radio circuit 402 with a control signal for calling the master unit 100. While the control signal is modulated by the radio circuit 402 and transmitted from the antenna 401, the radio circuit 402 is initiated to be ready for receiving a response signal from the master unit. Meanwhile, the control module 112 of the master unit 100 drives the radio circuit 107 to be ready for receiving the control signal from the sub unit. When the radio control signal calling the master unit 100 is received from the sub unit and transferred via the antenna 108 to the radio circuit 107 where it is demodulated, a resultant demodulated control signal for calling is then transferred to the control module 112. Upon receiving the control signal, the control module 112 delivers a response signal to the radio circuit 107 where it is modulated before being transmitted from the antenna 108. A radio signal including the response signal transmitted from the master unit 100 is received by the antenna 401 and transferred to the radio circuit 402 in the sub unit. As the response signal demodulated by the radio circuit 402 is transferred to the control module 409, a radio link between the master unit and the sub unit is achieved. The control module 409, after achieving the radio link, reads out the telephone numbers from the dedicated telephone number memory 408 by the prescribed manner and delivers them to the radio circuit 402. The telephone number relevant data is then modulated by the radio circuit 402 and transmitted from the antenna 401.

A resultant radio signal including the telephone number relevant data is received by the antenna 108 and transferred to the radio circuit 107 in the master unit 100. The telephone number relevant data is demodulated by the radio circuit 107 and delivered to the control module 112 which in turn updates the content of the telephone number memory circuit 105 so as to call the sub unit when a call from the saved telephone number is received and then feeds the radio circuit 107 with a control signal indicating that the setting of the telephone number memory circuit 105 is completed. The control signal is demodulated by the radio circuit 107 and transmitted from the antenna 108. A radio signal including the control signal is then received by the antenna 401 and transferred to the radio circuit 402 in the sub unit. The control signal is demodulated by the radio circuit 402 and transferred to the control module 409. When the control module 409 detects the control signal indicating that the setting is completed, it terminates the transfer mode for the telephone number relevant data.

As described, according to the method of Embodiment 2, the telephone numbers of selected callers to be displayed when a call is made from one of the telephone numbers, which are desired by the user, can be determined and saved with much ease in the telephone number memory circuit because they are favorably selected and stored in the separate telephone number memory circuit dedicated to the terminal telephone of the user.

Embodiment 3

Figure 3:
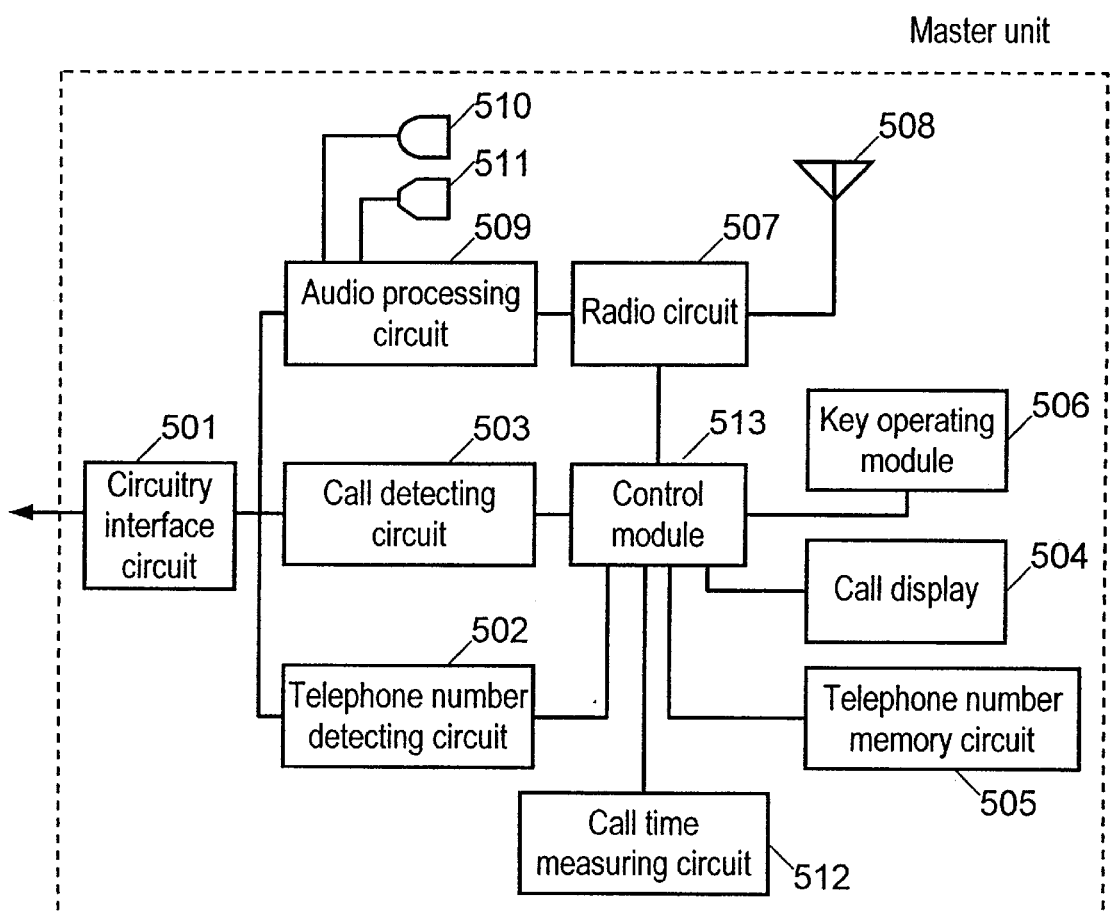
FIG. 3 is a schematic view of another example of the master unit of a cordless telephone set as a call receiving module of Embodiment 1 of the calling apparatus of the present invention, in which an interface circuit 101, telephone number detecting circuits 102 and 502, call detecting circuits 103 and 503, call displays 104, 203, 303, 403, and 504, telephone number memory circuits 105 and 505, key operating modules 106, 204, 304, 404, and 506, radio circuits 107, 202, 302, 402, and 507, antennas 108, 201, 301, 401, and 508, a dedicated telephone number memory circuit 408, control modules 112, 208, 308, 409, and 513, a circuitry interface circuit (I/F) 501, and a call time measuring circuit 512 are illustrated.

FIG. 3 illustrates another example of the master unit of the cordless telephone described with Embodiment 1, which has a calling apparatus of the present invention.

The master unit of Embodiment 3 comprises, as shown, a circuitry interface circuit 501 provided at a connecting region between the service network and the master unit, a telephone number detecting circuit 502 for detecting the telephone number of a caller received via the circuitry interface circuit 501 from the service network and outputting its data, a call detecting circuit 503 for detecting a call signal received via the circuitry interface circuit 501 from the service network and outputting a call detection signal, a call display 504 for, when the receipt of a call from the service network is detected by the call detecting circuit 503, displaying the call with a combination of light, characters, and symbols, a telephone number memory circuit 505 in which relevant data for selectively determining the display on the call receiver display of the call depending on the telephone number detected by the telephone number detecting circuit 502 are stored, a key operating module 506 provided with a key pad for setting the relevant data in the telephone number memory circuit 505 and for responding to the call, a radio circuit 507 for converting an audio signal and a control signal such as a call signal into radio signals for transmission and also demodulating a received radio signal into an audio signal and a control signal, an antenna 508 for transmitting and receiving the radio signal, an audio signal processing circuit 509 for performing signal processing such as amplification of the audio signal during the connection, a microphone 510 for picking up sound during the connection, a loudspeaker 511 for emitting sound during the connection, a call time measuring circuit 512 for, when a call from one the callers saved in the telephone number memory circuit 505 is received, measuring a duration of time from start up of controlling the call display to display of the call, and a control module 513 for controlling the entire action of the master unit.

The action of the cordless telephone with the calling apparatus of the present invention described above when a call is received will now be explained.

When a call is received from the service network, a signal including the telephone number data of a caller is supplied. The signal including the telephone number data of the caller is transferred via the circuitry interface circuit 501 to the telephone number detecting circuit 502 in the master unit. The telephone number detecting circuit 502 extracts the telephone number of the caller from the signal and delivers it to the control module 513. Also, a call signal indicating that the call is made is received from the service network. The call signal is introduced via the circuitry interface circuit 501 to the call signal detecting circuit 503 in the master unit. The call signal detecting circuit 503 upon detecting the call signal informs the control module 513 that the call signal is received. The control module 513 when informed that the call is received compares the telephone number of the caller detected by the telephone number detecting circuit 502 with the telephone number data stored in the telephone number memory circuit 505. When the telephone number of the caller is found as registered in the telephone number memory circuit 505, it is selectively displayed on the master and/or sub units depending on its relevant data registered in the memory.

For displaying the call on the master unit, the control module 513 signals and directs the call display 504 of the master unit to display the call. For displaying the call on any of the sub units, the control module 513 directs the radio circuit 507 to modulate the control signal indicating that the call is received to a radio signal which is then transmitted from the antenna 508. The control module 513 then starts up the call time measuring circuit 512. The call time measuring circuit 512, when a predetermined duration of time has elapsed after the start up action of the control module 513, informs the control module 513 that its calling is timed up. Upon receiving a time-up signal from the call time measuring circuit 512, the control module 513 directs all the call displays of the master unit and the sub units to display the telephone number. More specifically, the control module 513 delivers another control signal to the call displays other than the call display which had previously been driven to display the call. When the control module 513 receives a response from the call responding means before the call time measuring circuit 512 is timed up, it stops and resets the action of the call time measuring circuit 512, canceling the display on all the call displays.

A method of setting the telephone number memory circuit 505 is similar to the setting of the telephone number memory circuit 105 of the master unit 100 described with Embodiment 1 and will be explained in no more detail, as like components are denoted by like numerals as those of Embodiment 1, According to the calling method of the telephone of Embodiment 3, when no response is made within a predetermined length of time, all of the call displays are driven to indicate that the call is received from the service network and thus explicitly displaying the state of calling. In other words, if the target telephone terminal to which the call is made fails to respond, any other telephone terminal can receive the call.

As set forth above, the calling apparatus of the telephone system according to the present invention allows a particular one of the telephone terminals, which has been registered, to display the call depending on the telephone number of a caller. Hence, any troublesome transfer of the call will be minimized while the secrecy of the call is favorably protected.

Also, the telephone number data saved in the telephone terminal can be transferred and used in the master unit for determining the display of a call. In the case where the sub unit is a PHS telephone having its own telephone number data including a list of telephone numbers and a history of calls, it allows the master unit to set the call display with ease and to carry no input means such as a key operating module, hence contributing to lowering the cost of the master unit.

Moreover, the call is displayed on only a desired one of the telephone terminals and if no response is made, the remaining telephone terminals can receive the call. This minimizes any troublesome transfer of the call and permits any other terminal to receive the call when the target terminal or the called user fails to respond.

What is claimed is:

1. A calling apparatus comprising:

a master unit; and at least one sub unit linked to said master unit, wherein said at least one sub unit comprises:

key operation module setting means for setting at least one telephone number of at least one caller to be saved and transferring the at least one telephone number of the at least one caller to said master unit; and dedicated telephone number memory means for storing the at least one telephone number of the at least one caller, and said master unit comprises:

an interface circuit for connecting to the service network;

call detecting means connected to said interface circuit for detecting a call from the service network;

telephone number detecting means connected to said interface circuit for detecting a telephone number of a caller transmitted by the service network during a connection with the service network;

telephone number memory means for storing data, including the at least one telephone number of the at least one caller stored in said dedicated telephone number memory means, indicating that the call is to be displayed on at least one of said master unit and said at least one sub unit depending on the telephone number of the caller; and controlling means for comparing, when said call detecting means detects the call from the service network and said telephone number detecting means detects the telephone number of the caller, the detected telephone number with the data stored in said telephone number memory means and directing the call to said at least one of said master unit and said at least one sub unit to display that the call is received from the service network.

2. A calling apparatus according to claim 1, wherein said at least one sub unit and said master unit each further comprise call displaying means for displaying the call with at least one of light, characters, and symbols.

3. A calling apparatus according to claim 1, wherein said at least one sub unit and said master unit each further comprise a radio circuit such that said at least one sub unit and said master unit communicate wirelessly.

4. A calling apparatus comprising:

a master unit; and at least one sub unit linked to said master unit, wherein said at least one sub unit comprises:

key operation module setting means for setting at least one telephone number of at least one caller to be saved and transferring the at least one telephone number of the at least one caller to said master unit; and dedicated telephone number memory means for storing the at least one telephone number of the at least one caller, and said master unit comprises:

an interface circuit for connecting to the service network;

call detecting means connected to said interface circuit for detecting a call from the service network;

telephone number detecting means connected to said interface circuit for detecting a telephone number of a caller transmitted by the service network during a connection with the service network;

telephone number memory means for storing data, including the at least one telephone number of the at least one caller stored in said dedicated telephone number memory means, indicating that the call is to be displayed on at least one of said master unit and said at least one sub unit depending on the telephone number of the caller; and controlling means for comparing, when said call detecting means detects the call from the service network and said telephone number detecting means detects the telephone number of the caller, the detected telephone number with the data stored in said telephone number memory means and directing the call to said at least one of said master unit and said at least one sub unit to display that the call is received from the service network, and for directing, when no response to the call is made within a predetermined length of time by said at least one of said master unit and said at least one sub unit, the call to all of said master unit and said at least one sub unit to display that the call is received from the service network.

5. A calling apparatus according to claim 4, wherein said master unit further comprises call time measuring means for measuring a duration of time from when said controlling means directs the call to said at least one of said master unit and said at least one sub unit to one of when a response to the call is made and when the predetermined length of time has been reached.

6. A calling apparatus according to claim 4, wherein said at least one sub unit and said master unit each further comprise call displaying means for displaying the call with at least one of light, characters, and symbols.

7. A calling apparatus according to claim 4, wherein said at least one sub unit and said master unit each further comprise a radio circuit such that said at least one sub unit and said master unit communicate wirelessly.

8. A calling method for a calling apparatus connected to a service network, the calling apparatus comprising a master unit having a telephone number memory circuit and at least one sub unit having a dedicated telephone number memory circuit, said calling method comprising:

storing at least one telephone number of at least one caller in the dedicated telephone number memory circuit in the at least one sub unit;

transferring the at least one telephone number from the dedicated telephone number memory circuit to the telephone number memory circuit of the master unit;

storing data, including the at least one telephone number, in the telephone number memory circuit of the master unit indicating that the at least one telephone number is associated with at least one of the master unit and the at least one sub unit;

detecting, at the master unit, a received call from the service network;

detecting, at the master unit, a telephone number of the received call from the service network;

comparing the detected telephone number with the data stored in the telephone number memory circuit; and directing the received call to at least one of the master unit and the at least one sub unit, based on said comparing of the detected telephone number and the data, to display the received call from the service network.

9. A calling method according to claim 8, wherein the at least one sub unit and the master unit communicate wirelessly.

10. A calling method for a calling apparatus connected to a service network, the calling apparatus comprising a master unit having a telephone number memory circuit and at least one sub unit having a dedicated telephone number memory circuit, said calling method comprising:

storing at least one telephone number of at least one caller in the dedicated telephone number memory circuit in the at least one sub unit;

transferring the at least one telephone number from the dedicated telephone number memory circuit to the telephone number memory circuit of the master unit;

storing data, including the at least one telephone number, in the telephone number memory circuit of the master unit indicating that the at least one telephone number is associated with at least one of the master unit and the at least one sub unit;

detecting, at the master unit, a received call from the service network;

detecting, at the master unit, a telephone number of the received call from the service network;

comparing the detected telephone number with the data stored in the telephone number memory circuit;

directing the received call to at least one of the master unit and the at least one sub unit, based on said comparing of the detected telephone number and the data, to display the received call from the service network; and if no response is made by the at least one of the master unit and the at least one sub unit to which the received call is directed within a predetermined length of time, directing the received call to all of the master unit and the at least one sub unit to display the received call from the service network.

11. A calling method according to claim 10, wherein the at least one sub unit and the master unit communicate wirelessly.

12. A calling apparatus comprising:

a master unit; and at least one sub unit linked to said master unit, wherein said at least one sub unit comprises:
- a key operation module operable to set at least one telephone number of at least one caller to be saved and operable to transfer the at least one telephone number of the at least one caller to said master unit; and
- a dedicated telephone number memory operable to store the at least one telephone number of the at least one caller, and said master unit comprises:
- an interface circuit for connecting to the service network;
- a call detection circuit connected to said interface circuit, said call detection circuit being operable to detect a call from the service network;
- a telephone number detecting circuit connected to said interface circuit, said telephone number detecting circuit being operable to detect a telephone number of a caller transmitted by the service network during a connection with the service network;
- a telephone number memory operable to store data, including the at least one telephone number of the at least one caller stored in said dedicated telephone number memory, indicating that the call is to be displayed on at least one of said master unit and said at least one sub unit depending on the telephone number of the caller; and
- a control module operable to compare, when said call detecting circuit detects the call from the service network and said telephone number detecting circuit detects the telephone number of the caller, the detected telephone number with the data stored in said telephone number memory and direct the call to said at least one of said master unit and said at least one sub unit to display that the call is received from the service network.

13. A calling apparatus according to claim 12, wherein said control module is further operable, when no response to the call is made within a predetermined length of time by said at least one of said master unit and said at least one sub unit, to direct the call to all of said master unit and said at least one sub unit to display that the call is received from the service network.

14. A calling apparatus according to claim 13, wherein said master unit further comprises a call time measuring circuit operable to measure a duration of time from when said control module directs the call to said at least one of said master unit and said at least one sub unit to one of when a response to the call is made and when the predetermined length of time has been reached.

15. A calling apparatus according to claim 12, wherein said at least one sub unit and said master unit each further comprise a call display operable to display the call with at least one of light, characters, and symbols.

16. A calling apparatus according to claim 12, wherein said at least one sub unit and said master unit each further comprise a radio circuit such that said at least one sub unit and said master unit communicate wirelessly.

* * * * *